United States Patent
Mathis

(10) Patent No.: US 12,376,525 B2
(45) Date of Patent: Aug. 5, 2025

(54) SIMPLIFIED HAYMAKING MACHINE WITH A CARRIER

(71) Applicant: KUHN SAS, Saverne (FR)

(72) Inventor: Mathieu Mathis, Monswiller (FR)

(73) Assignee: KUHN SAS, Saverne (FR)

( * ) Notice: Subject to any disclaimer, the term of this patent is extended or adjusted under 35 U.S.C. 154(b) by 767 days.

(21) Appl. No.: 17/656,089

(22) Filed: Mar. 23, 2022

(65) Prior Publication Data

US 2022/0304237 A1    Sep. 29, 2022

(30) Foreign Application Priority Data

Mar. 25, 2021   (FR) ...................................... 21 03008

(51) Int. Cl.
*A01D 78/10* (2006.01)
*A01D 78/00* (2006.01)

(52) U.S. Cl.
CPC ....... *A01D 78/1028* (2013.01); *A01D 78/007* (2013.01); *A01D 78/1007* (2013.01)

(58) Field of Classification Search
CPC ........ A01B 73/00–73/067; A01D 78/00–78/20
See application file for complete search history.

(56) References Cited

U.S. PATENT DOCUMENTS 6,112,827 A * 9/2000 Reiber ................. A01B 73/065
172/311
6,302,220 B1 * 10/2001 Mayerle ................. A01C 7/205
172/459

(Continued)

FOREIGN PATENT DOCUMENTS

DE   202018106434 U1 * 3/2020
EP     0 984 676 A2    3/2000
(Continued)

OTHER PUBLICATIONS

French Preliminary Search Report issued Dec. 17, 2021 in French Application 21 03008 filed on Mar. 25, 2021, 10 pages (with English Translation of Categories of Cited Documents & Written Opinion).

*Primary Examiner* — Christopher J Sebesta
*Assistant Examiner* — Madeline I Runco
(74) *Attorney, Agent, or Firm* — Oblon, McClelland, Maier & Neustadt, L.L.P.

(57) ABSTRACT

The present invention relates to an agricultural haymaking machine comprising a chassis resting on the ground by at least one wheel and intended to be coupled to a tractor able to move the machine in a direction of advance, a carrier carrying a plurality of rotors being swivel mounted to the chassis around a central pin oriented transversally to the direction of advance, each rotor being driven around a respective drive axis, and a lift actuator, articulated to the chassis on one hand and to the carrier on another hand, being able to make the carrier pivot around the central pin relative to the chassis, the machine being able to adopt a headland configuration in which the carrier is raised, as well as a work configuration in which the carrier rests on the ground by means of at least one support. The central pin is rigidly attached to the carrier, and the machine comprises a positioning actuator able to move the central pin relative to the chassis to change the position of the drive axes relative to the ground.

9 Claims, 7 Drawing Sheets

(56) References Cited

U.S. PATENT DOCUMENTS

| | | | |
|---|---|---|---|
| 6,374,922 B1 | | 4/2002 | Friggstad |
| 6,374,923 B1 | | 4/2002 | Friggstad |
| 10,028,423 B2 | * | 7/2018 | Sudrink ............... A01B 63/32 |
| 2007/0266688 A1 | * | 11/2007 | Van Den Engel ..... A01B 73/02 |
| | | | 56/14.9 |
| 2014/0373496 A1 | * | 12/2014 | Schott ................... A01D 78/10 |
| | | | 56/10.2 E |
| 2020/0288620 A1 | * | 9/2020 | Chwialkowski ..... A01B 63/008 |
| 2023/0127688 A1 | * | 4/2023 | Springer ............ A01D 78/1014 |
| | | | 56/365 |

FOREIGN PATENT DOCUMENTS

| | | | | |
|---|---|---|---|---|
| EP | 2436251 A1 | * | 4/2012 | ........... A01B 63/002 |
| EP | 2436260 A1 | * | 4/2012 | ......... A01D 78/1014 |
| EP | 2499897 A1 | * | 9/2012 | ......... A01D 78/1014 |
| EP | 3245857 A1 | * | 11/2017 | ............. A01B 51/04 |
| EP | 3915350 A1 | * | 12/2021 | ............. A01B 63/32 |
| WO | WO 98/52402 A2 | | 11/1998 | |
| WO | WO-2015052427 A1 | * | 4/2015 | ......... A01D 78/1028 |

\* cited by examiner

[Fig. 1]
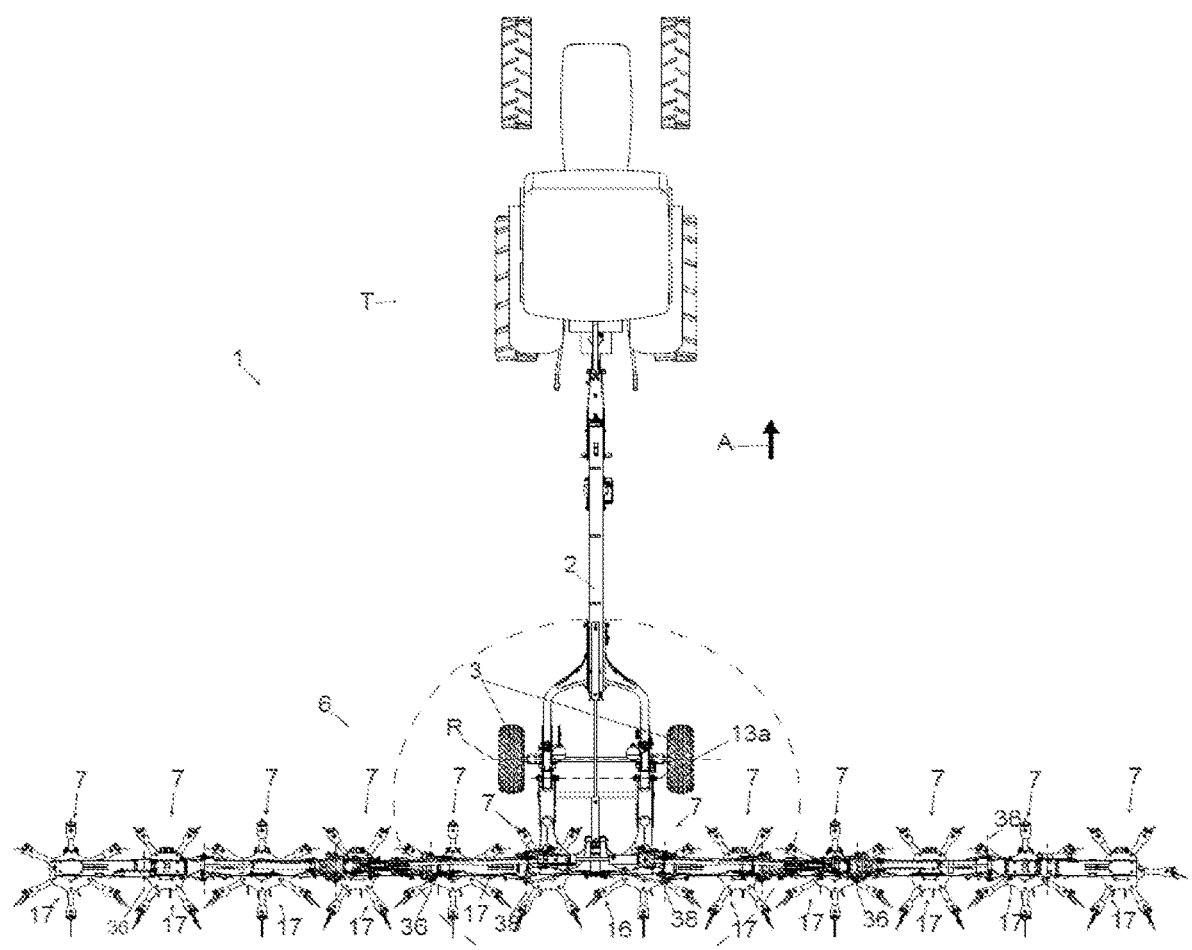

[Fig. 2]
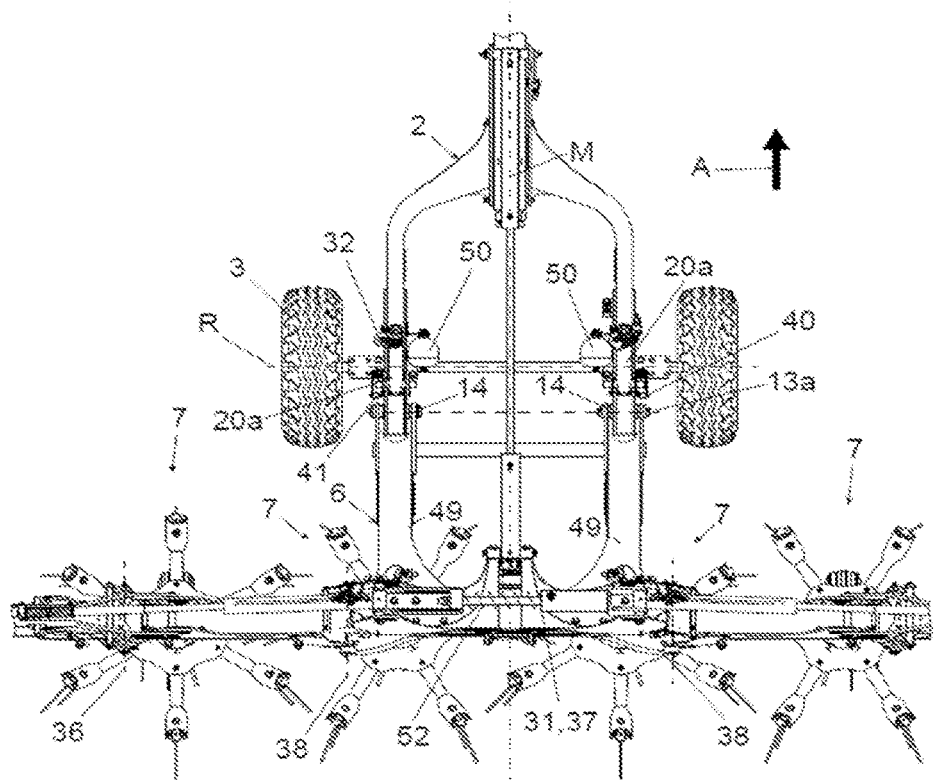
[Fig. 3]
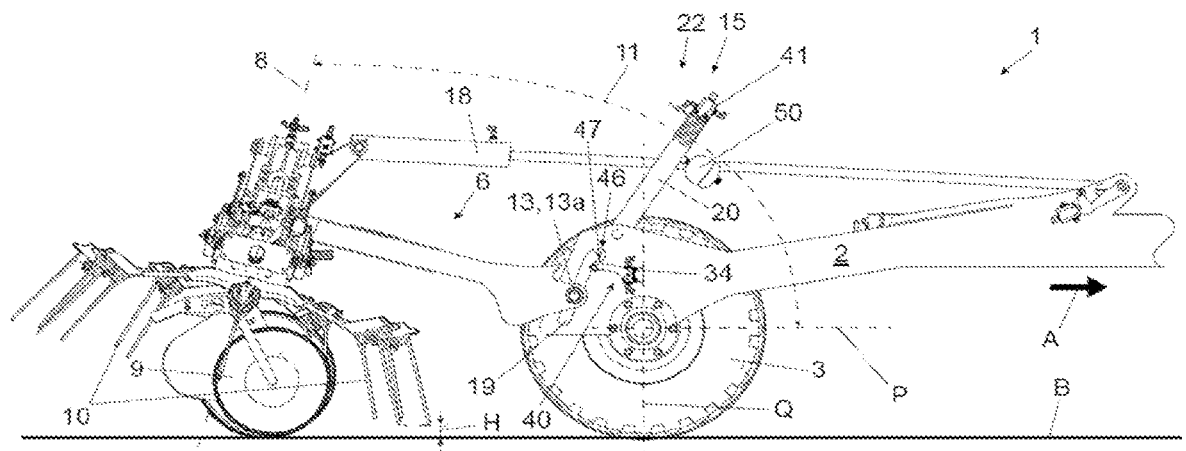

[Fig. 4]
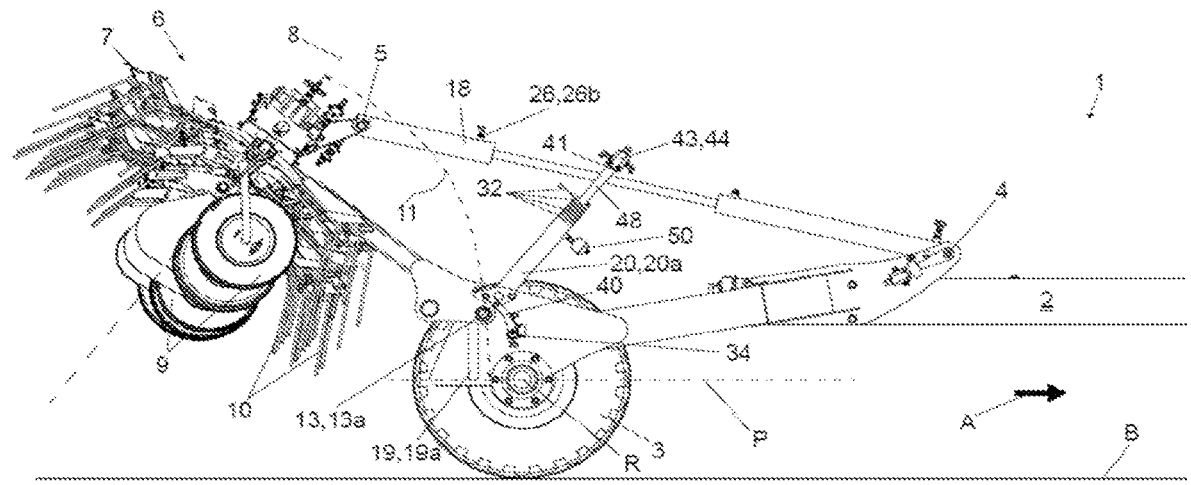
[Fig. 5]
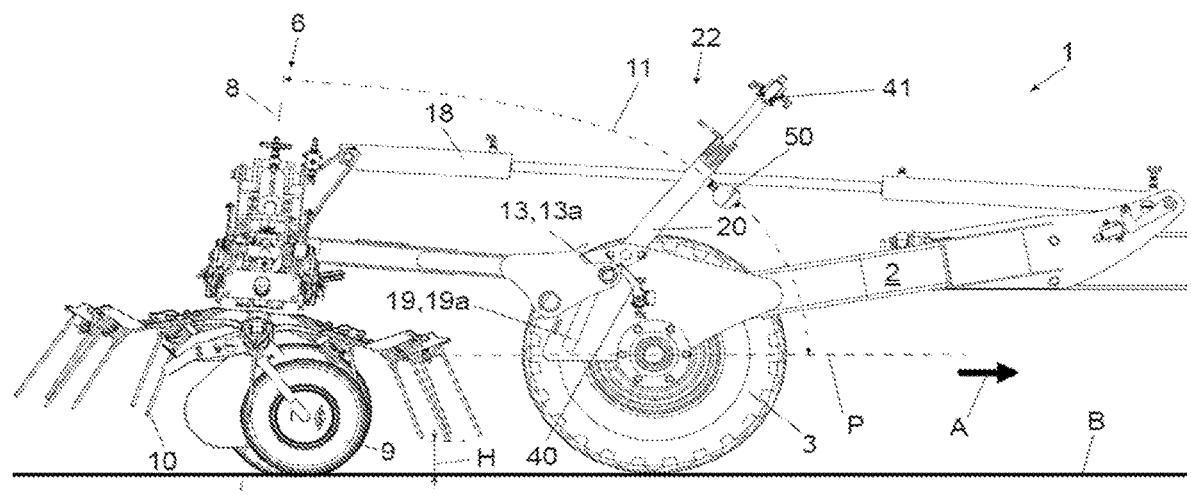

[Fig. 6]
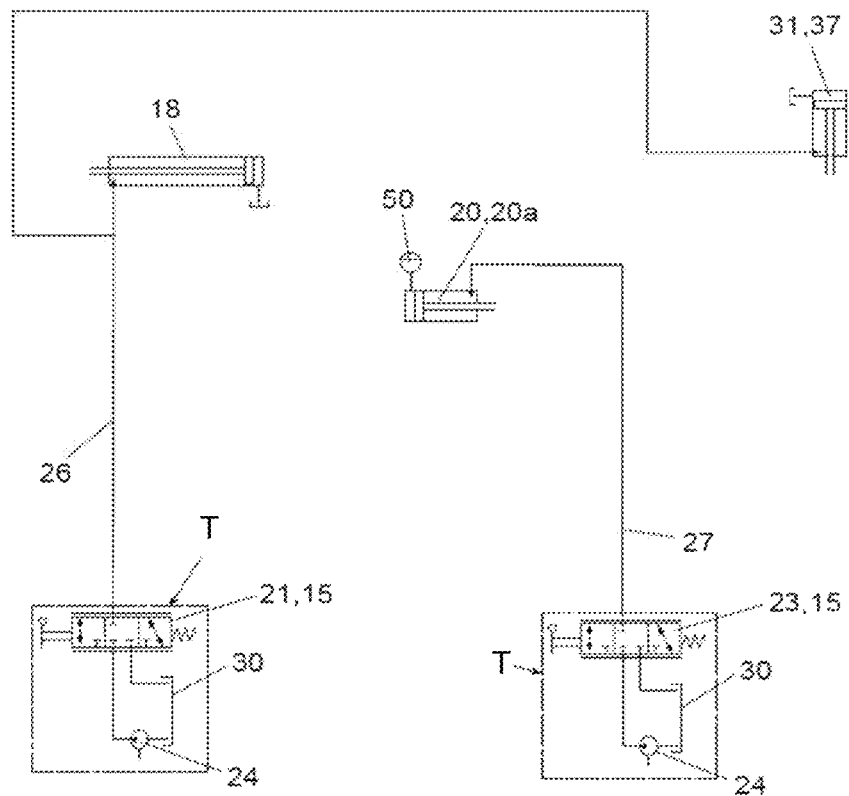

[Fig. 7]
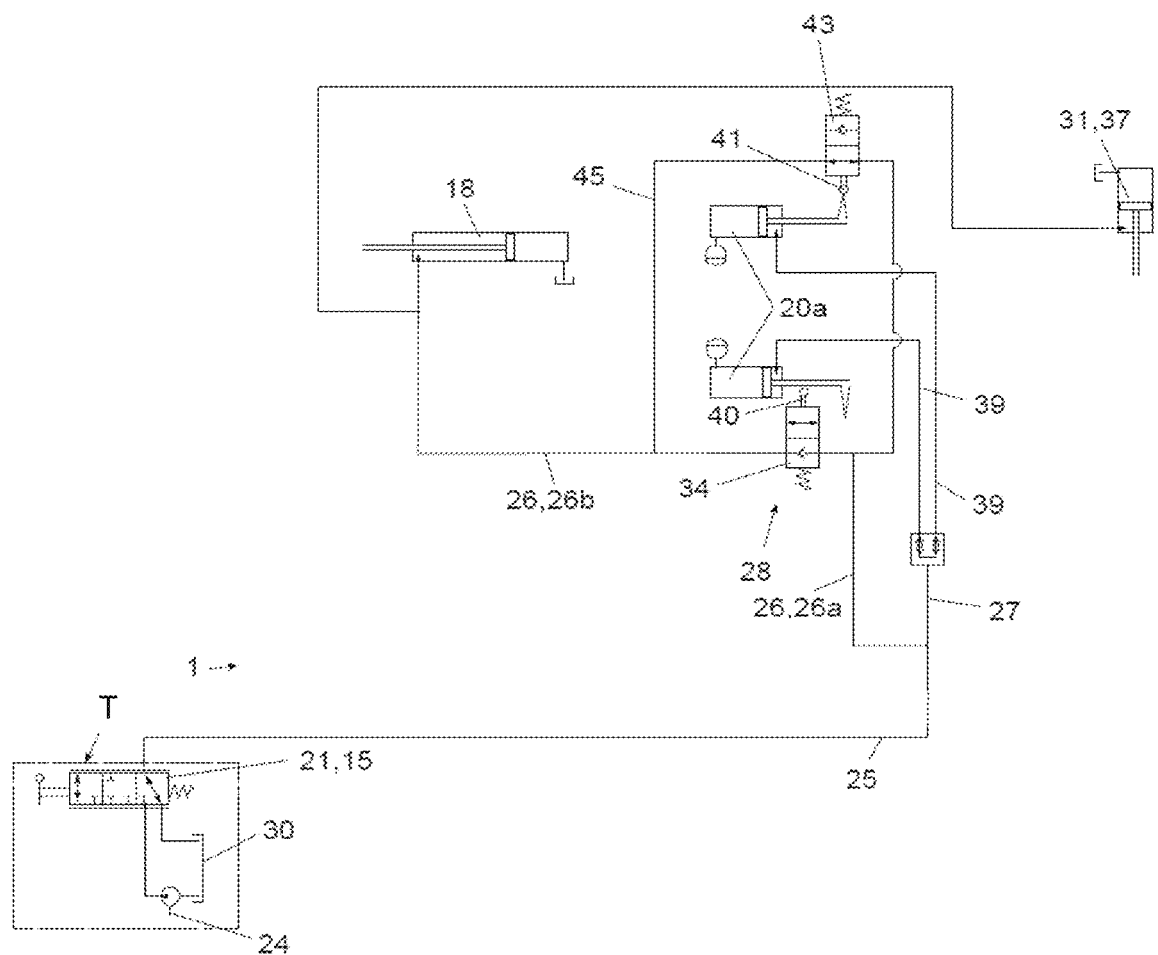

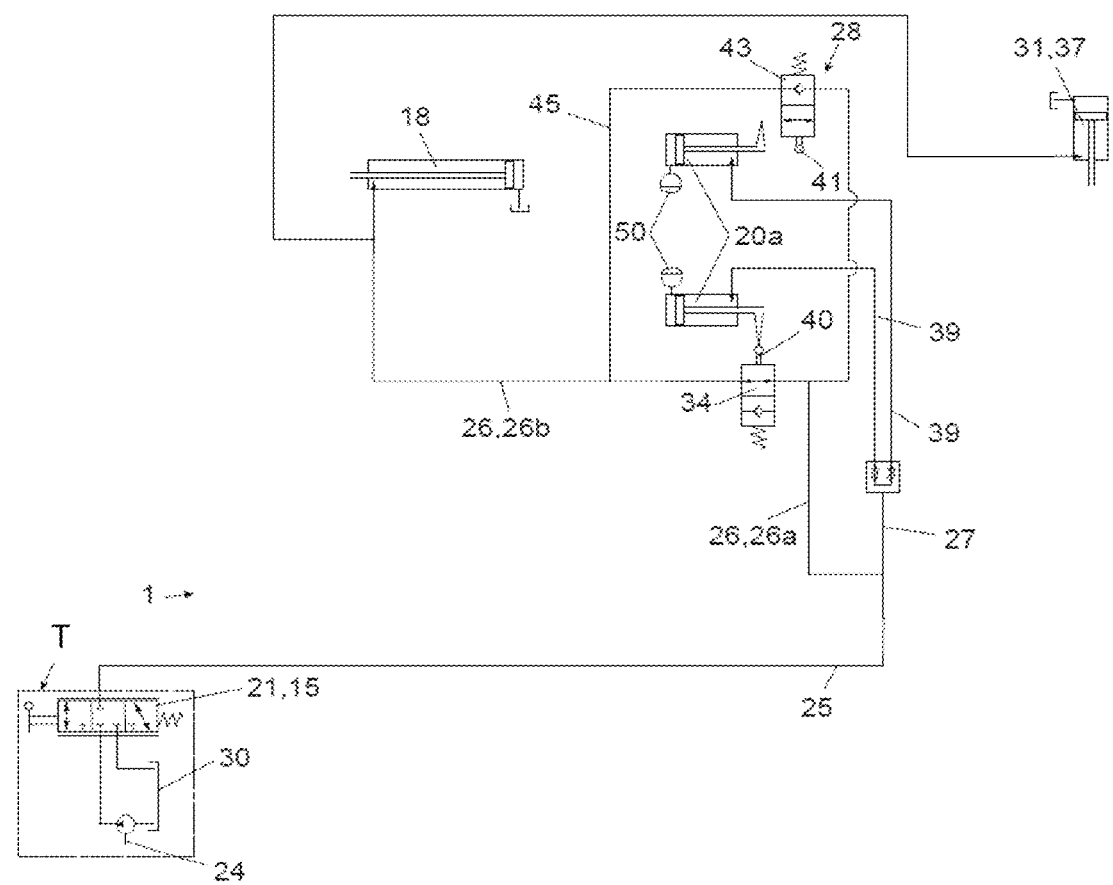
[Fig. 8]

[Fig. 9]
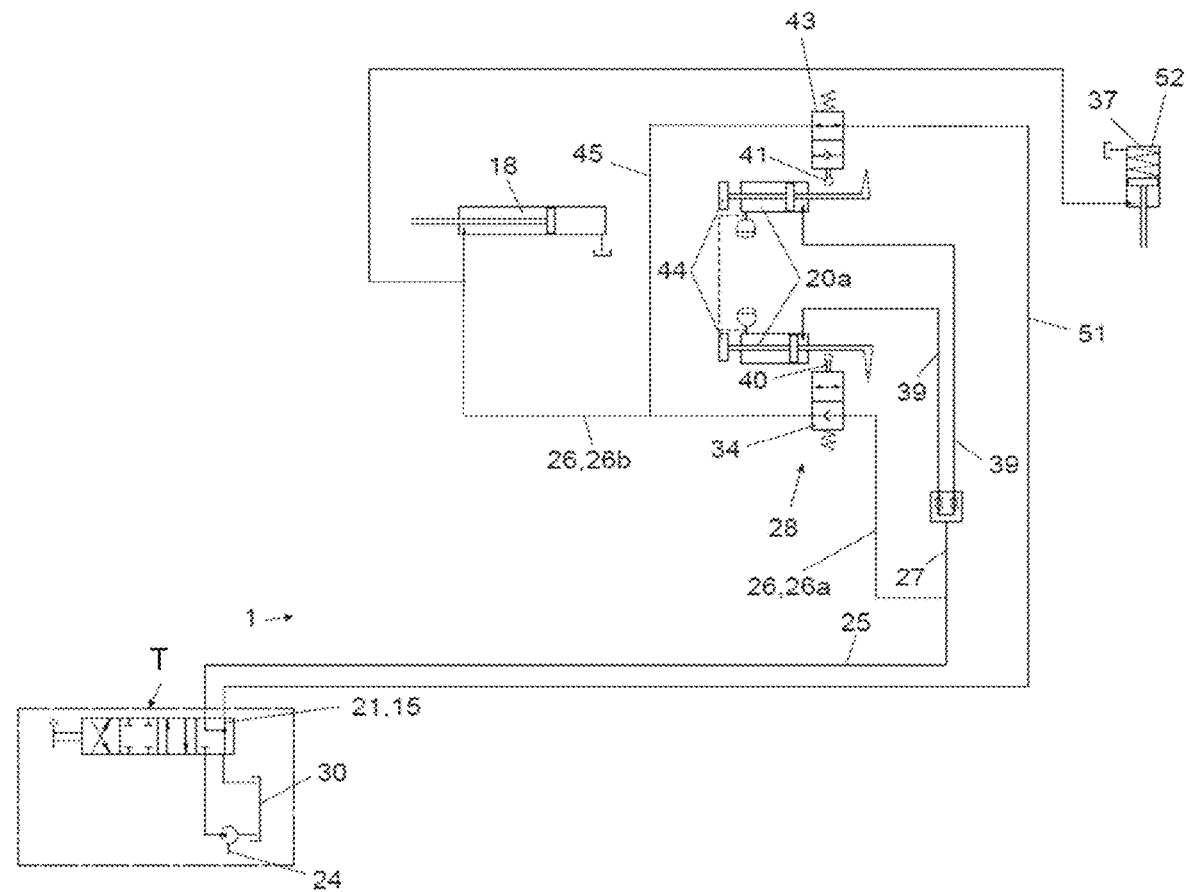
[Fig. 10]
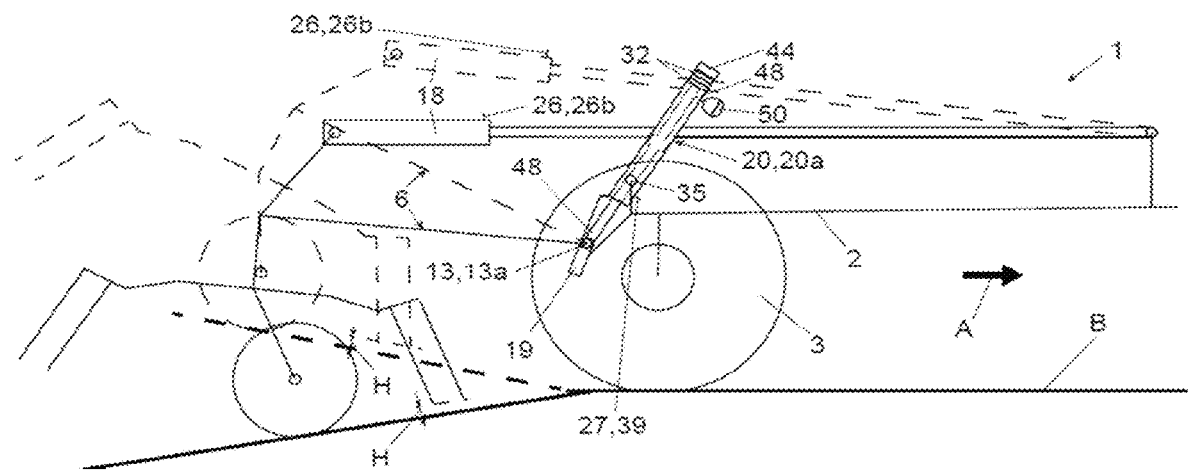

SIMPLIFIED HAYMAKING MACHINE WITH A CARRIER

BACKGROUND OF THE INVENTION

Field of the Invention

The present publication relates to an agricultural haymaking machine, specifically a tedder, comprising a chassis resting on the ground by means of at least one wheel and intended to be coupled to a tractor able to move the machine in a direction of advance, the machine (1) comprising a carrier carrying a plurality of rotors, the carrier being swivel mounted with respect to the chassis around a central pin oriented transversally relative to the direction of advance, each rotor being driven around a respective drive axis, and a lift actuator, articulated to the chassis on one hand and to the carrier on another hand, able to make the carrier pivot around the central pin relative to the chassis, the machine being able to be in a headland configuration in which the carrier is raised, as well as a work configuration in which the carrier rests on the ground by means of at least one support.

Description of the Related Art

Document EP 2 499 897 A1 describes a machine matching the above description. On this machine, the carrier is raised relative to the chassis in a headland configuration when it is required to move over swaths without deforming them, and/or for driving the machine on roads in a transport configuration, in which case, some rotors are furthermore brought closer to the chassis. Accordingly, the carrier is swivel mounted at the rear of the chassis around a central pin, and around which the carrier can be pivoted by a lift actuator to be raised.

So as not to damage the vegetation covering during the switch between the work configuration and the headland configuration, the carrier is pivoted, from its work configuration, around an intermediate axis that connects the carrier to an intermediate frame. Subsequently, the carrier is pivoted, at the same time as the intermediate frame, around the central pin connecting the intermediate frame to the chassis, thus ending in the machine's headland configuration.

One drawback of the machine from documents EP 2 499 897 A1 is the complexity of the connection between the carrier and the central pin.

SUMMARY OF THE INVENTION

The present invention aims to propose a machine with simple kinematics, also making it possible to preserve the vegetation covering.

Therefore, one important feature of the invention is that the central pin is rigidly attached to the carrier, and that the machine comprises a positioning actuator able to move the central pin relative to the chassis to change the position of the drive axes relative to the ground.

Such a feature makes it possible to articulate the carrier directly on the chassis around the central pin and, during the switch from a work configuration to a headland configuration, to distance the front portion of the rotors from the ground before raising the carrier relative to the chassis, thus avoiding damage to the vegetation covering the ground. The carrier being directly connected to the chassis, the machine has no intermediate chassis and no additional joint, and its kinematics are simpler.

The invention will be better understood upon reading the following description, from which further advantages will emerge, with reference to the schematic drawings given as examples, wherein:

BRIEF DESCRIPTION OF THE DRAWINGS

FIG. 1 shows a top view of an example embodiment of a machine according to the invention, hitched to a tractor and in work configuration;

FIG. 2 shows a detail view of FIG. 1;

FIG. 3 shows a side view of the machine of FIG. 1 according to the preferred embodiment, in work configuration;

FIG. 4 shows a side view of a machine according to one embodiment variant, in headland configuration;

FIG. 5 shows a side view of a machine according to the invention, in an intermediate configuration;

FIG. 6 shows a simplified version of the machine's hydraulic diagram according to another embodiment variant, in headland configuration, in which the positioning actuator and the lift actuator are hydraulically connected separately to the tractor;

FIG. 7 shows a simplified version of a machine's hydraulic diagram according to an alternative embodiment, in work configuration;

FIG. 8 shows a simplified version of the hydraulic diagram of FIG. 7, with the machine in headland configuration;

FIG. 9 shows a simplified version of a machine's hydraulic diagram according to the preferred embodiment, in work configuration; and FIG. 10 shows a schematic side view of a machine according to the invention in various situations, in the configuration.

DETAILED DESCRIPTION OF THE PREFERRED EMBODIMENTS

The agricultural haymaking machine (1), specifically a tedder, as shown in FIG. 1, comprises a chassis (2) resting on the ground (B) by means of at least one wheel (3). The machine (1) is coupled to a tractor (T) able to move it in a direction of advance (A). The machine (1) comprises a carrier (6) carrying a plurality of rotors (7). The carrier (6) is swivel mounted with respect to the chassis (2) around a central pin (13) oriented transversally to the direction of advance (A). Each rotor (7) is driven around a respective drive axis (8). The machine (1) also comprises a lift actuator (18) articulated to the chassis (2) on one hand and to the carrier (6) on another hand. The lift actuator (18) is able to make the carrier (6) pivot in relation to the chassis (2) around the central pin (13). The machine (1) can adopt an headland configuration in which the carrier (6) is raised, as well as a work configuration in which the carrier (6) rests on the ground (B) by means of a support (9).

The direction of advance (A) is represented by a bold type arrow in the figures. While moving in the direction of advance (A), the at least one wheel (3) turns around a rotary axis (R). The rotary axis (R) is orthogonal to the direction of advance (A). The chassis (2), respectively its largest dimension, extends along a direction parallel to the direction of advance (A). FIGS. 1 and 2 show that the chassis (2) preferably rests on two wheels (3).

The support (9) is preferably made by at least one roller. It could also be at least one skid. Preferably, the carrier (6) rests on the ground (B) by means of the respective roller of each rotor (7), in work configuration. In this document, the ground (B) is defined as the surface on which the wheel(s) (3) of the chassis (2) and the support (9) of the carrier (6) rest in work configuration. Each rotor (7) comprises raking fingers (10). Preferably each finger (10) is connected to a disc by a leg. The legs are oriented substantially radially relative to the respective drive axis (8). Each rotor (7) can have 4 to 8 legs. The tractor (T) makes it possible to drive the machine (1), respectively the rotors (7). Thanks to their rotation, the fingers (10) pick up and lift a product lying on the ground (B) and throw it rearward. The product is, for example, cut grass. To couple the machine (1) to the tractor (T), the chassis (2) is fitted with a coupling device. The coupling device is preferably located at the front end of the chassis (2), so as not to roll over the product the machine (1) is working on.

Preferably, the central pin (13) is a joint with a central axis (13a). Preferably the central pin (13), respectively the central axis (13a), is orthogonal to the direction of advance (A). The central axis (13a) is furthermore horizontal. It is also parallel to the rotary axis (R). In work configuration, the carrier (6), respectively its largest dimension, extends substantially orthogonal to the direction of advance (A), maximizing the working width of the machine (1). In FIGS. 1 and 2 particularly, the carrier (6) is located at the rear of the chassis (2). Accordingly, the central pin (13) is located at the rear end of the chassis (2), thus providing greater freedom of movement of the carrier (6) relative to the chassis (2). Preferably, the central pin (13) is located at the rear of the rotary axis (R). A reference plane (P) oriented parallel to the direction of advance (A) and passing through the rotary axis (R) is defined. For simpler reading, and unless otherwise stated, the positions and orientations refer to the case where the machine (1) and the tractor (T) are on flat and horizontal ground (B), in work configuration of the machine (1).

In work configuration, the drive axes (8) are substantially vertical in a view along the direction of advance (A). All the drive axes (8) are included in a same plane, at least in work configuration. As can be seen in FIG. 3, to improve the raking quality of the rotors (7), the drive axes (8) are tilted frontward. Each drive axis (8) forms an angle, called "guide angle" (11), with the reference plane (P). The guide angle (11) is preferably between 60° and 90° in work configuration and more preferably between 70° and 80°. The raking height (H) is the distance between the front portion of the rotors (7), more specifically the free end of the front raking finger (10) of each rotor (7), and the ground (B). This distance makes it possible to pick up the product without damaging the soil or vegetation covering.

Such as shown in FIG. 4, in the headland configuration, the support (9) is not in contact with the ground (B). The at least one wheel (3) of the chassis (2) remains in contact with the ground (B) in work and in headland configuration. In the headland configuration, the drive axes (8) are tilted frontward at least as much as in work configuration. Preferably, the guide angle (11) is between 30° and 70° in the headland configuration and more preferably between 40° and 60°.

The lift actuator (18) is articulated to the chassis (2) by a front joint (4). The front joint (4) is located above the central pin (13). The lift actuator (18) is articulated to the carrier (6) by a rear joint (5) also located above the central pin (13). Changing the length of the lift actuator (18) requires the carrier (6) to pivot around the central pin (13).

The axis of the front joint (4) is parallel to the central axis (13a). The axis of the front joint (4) is fixed with respect to the chassis (2) and with respect to the lift actuator (18). The axis of the rear joint (5) is also parallel to the central axis (13a). The axis of the rear joint (5) is fixed with respect to the carrier (6) and with respect to the lift actuator (18).

According to the invention, the central pin (13) is rigidly attached to the carrier (6). The carrier (6) is thus directly articulated to the chassis (2) around the central pin (13). Since the machine (1) according to the invention requires no intermediate part or additional joint between the chassis (2) and the carrier (6), its kinematics is advantageously simple.

Also according to the invention, the machine (1) comprises a positioning actuator (20) making it possible to move the central pin (13) relative to the chassis (2) to change the position of the drive axes (8). Consequently, the positioning actuator (20) makes it possible to change the guide angle (11). Since the guide angle (11) has an influence over the raking height (H), the positioning actuator (20) can thus move the front portion of the rotors (7) away from the ground (B). The positioning actuator (20) can in particular lift the front portion of the rotors (7) before the lift actuator (18) pivots the carrier (6) upward. Consequently, during the switch between the work configuration and the headland configuration, there is no risk of the fingers (10) pitching into the ground (B). The vegetation covering of the ground (B) is preserved.

By moving the central pin (13), the positioning actuator (20) changes the guide angle (11) and consequently the raking height (H). The positioning actuator (20) makes it possible in particular to switch the machine (1) from the work configuration to an intermediate configuration in which the raking height (H) is higher than in work configuration. In the intermediate configuration shown in FIG. 5, the central pin (13) is higher than in work configuration. In this intermediate configuration, the drive axes (8) are substantially vertical.

The positioning actuator (20) is preferably articulated to the chassis (2) on one hand and to the carrier (6) on another hand. The positioning actuator (20) is articulated to the chassis (2) by an inner joint (35). The axis of the inner joint (35) is fixed with respect to the chassis (2). The positioning actuator (20) is articulated directly on the central pin (13) around the central axis (13a). The positioning actuator (20) is separate from the lift actuator (18), advantageously making it possible to activate them independently.

To guide the motion of the central pin (13) relative to the chassis (2), a sliding guide (19) is made in the chassis (2). Preferably, the sliding guide (19) is mainly linear in side view. It could however be curved in side view. The sliding guide (19), respectively its length, has at least one vertical component. The central pin (13) is mounted as a sliding pivot in the sliding guide (19). The activation of the positioning actuator (20), respectively a change in its length, thus entails the motion of the central pin (13) at least along a vertical component (see FIGS. 3 and 4) relative to the chassis (2).

Preferably, the inner joint (35) is parallel to the central axis (13a). To minimize the length of the positioning actuator (20), the inner joint (35) is located near the sliding guide (19). In order the central pin (13) moves over the entire length of the sliding guide (19), the inner joint (35) is located above the sliding guide (19). Therefore, the positioning actuator (20) extends mainly above the chassis (2), preventing it from being in contact with the ground (B) and the product.

In a straightforward way, the central pin (13) is fixed with respect to the carrier (6). For example, it is welded to the carrier (6). The central pin (13) is preferably located at the front of the carrier (6). In addition, it is offset in the direction of advance (A) in side view, relative to the support points of the rollers (9). The upward movement of the central pin (13) relative to the chassis (2) entails an upward movement of the front of the carrier (6), thus changing the raking height H).

The lift actuator (18) enables the switch between the intermediate configuration and the headland configuration. Preferably, to switch the machine (1) from the intermediate configuration to the headland configuration, the length of the lift actuator (18) is shortened. The carrier (6) then pivots upward relative to the chassis (2) around the central pin (13) until the headland configuration is reached. The lift actuator (18) is embodied by at least one cylinder.

As can be seen in FIG. 6, the lift actuator (18) is connected to a primary pipe (26). It is translational and hydraulic. Preferably it operates in single-effect mode. The tractor (T) comprises in particular a hydraulic pump (24) and a reservoir (30). The tractor (T) also comprises at least one distributing valve (21, 23). When the primary pipe (26) is connected to the pump (24), the lift actuator (18) is activated and causes the carrier (6) to pivot upward around the central pin (13).

The positioning actuator (20) is embodied by at least one positioning jack (20a). The positioning actuator (20) is connected to a secondary pipe (27). The or each positioning jack (20a) is preferably hydraulic and translational. When the secondary pipe (27) is connected to the pump (24), the positioning actuator (20) is activated and moves the central pin (13) upward relative to the chassis (2).

As can be seen in FIG. 8, a main pipe (25) connects the tractor (T) to the primary pipe (26) and to the secondary pipe (27). Preferably, the main pipe (25) is connected to the tractor (T) via a single distributing valve (21), making it advantageously possible to reduce the number of distributing valves (21, 23) required to operate the machine (1).

It is clear from the foregoing, that a control device (15) makes it possible to simultaneously activate the lift actuator (18) and the positioning actuator (20). Preferably, the control device (15) is embodied by a distributing valve (21) connected to the main pipe (25). In the embodiment variant shown in FIG. 6, the control device (15) is, for example, an electronic control unit that makes it possible to simultaneously activate the distributing valve (21) connected to the lift actuator (18) and the distributing valve (23) connected to the positioning actuator (20).

Preferably, as can be seen in FIG. 1, the chassis (2) is symmetrical along a midplane (M). To reduce the risk of placing the carrier (6) obliquely in relation to a plane perpendicular to the direction of advance (A), the carrier (6) preferably comprises two arms (49), on either side of the midplane (M), as can be seen in FIG. 2. The arms (49) are parallel to the direction of advance (A) in top view. Preferably, the central pin (13) is embodied by two separate pins (14), each located at the front end of an arm (49). Each pin (14) is mounted in a respective oblong opening (19a) of the sliding guide (19). The positioning actuator (20) is then embodied by two positioning jacks (20a). Preferably, each pin (14) is directly articulated on a respective positioning jack (20a) connected to a respective branched pipe (39). The secondary pipe (27) then connects each branched pipe (39) to the main pipe (25). To ensure an identical force from the positioning jacks (20a), especially to compensate for a different pressure from the energy accumulators (50), the two energy accumulators (50) are linked by a hydraulic pipe. This hydraulic pipe is shown in dotted lines in FIG. 9. In one embodiment variant, the carrier (6) is articulated to the chassis (2) around a single pin and the positioning actuator (20) is located on the midplane (M) or close thereto.

FIG. 10 shows distinct positions of the carrier (6) relative to the chassis (2). In the continuous-line representation, the carrier (6) is lower than the chassis (2). In the dotted-line representation, the carrier (6) is higher than the chassis (2). As shown in FIG. 10, at least in work configuration, the length of the lift actuator (18) can advantageously change, with the carrier (6) automatically adjusting its position relative to the chassis (2) according to the unevenness of the ground (B). To achieve this, in work configuration, the primary pipe (26) is connected to the reservoir (30). This adjustment of the carrier (6) in work configuration makes it possible for the rotors (7) to better track the ground and prevents them, respectively their fingers (10), from damaging the vegetation covering.

To ensure the raking height (H) remains constant regardless of the changes in the length of the lift actuator (18), in work configuration, the machine (1) comprises a locking means (22) that keeps the length of the positioning actuator (20) constant.

The locking means (22) comprises a lower stop that makes it possible to lock the downward movement of the central pin (13) in work configuration. In the preferred embodiment, the lower stop of the locking means (22) is embodied by wedges (32) that limit the lengthening of the positioning actuator (20). The locking means (22) also comprises an upper stop that makes it possible to lock the upward movement of the central pin (13) in work configuration. In the preferred embodiment, the positioning actuator (20) if of the double effect type, and the upper stop of the locking means (22) is embodied by a hydraulic energy accumulator (50) connected to the positioning actuator (20). Preferably, the energy accumulator (50) is connected to the positioning actuator (20) such that it exerts a downward force on the central pin (13). In work configuration, the locking means (22) thus keeps the central pin (13) fixed in translation relative to the chassis (2). To allow the user to adjust the raking height (H), especially depending on whether the surface of the ground (B) to be worked is flat or has significant unevennesses, the position of the central pin (13) relative to the chassis (2) in work configuration is adjustable. Adjusting the raking height (H) also makes it possible to compensate for wear of the fingers (10) and to adapt to the various heights of the coupling device of the tractor (T). The lower stop of the locking means (22) is adjusted by changing the number of wedges (32). Preferably, wedges (32) are added or removed when the positioning actuator (20) is not retracted, for example in headland configuration (FIG. 4).

The fact that the central pin (13), respectively the central axis (13a), is fixed with respect to the chassis (2) in work configuration makes it possible to keep the raking height (H) substantially constant even on uneven ground, as can be seen in FIG. 10. In work configuration, the locking means (22) thus prevents the length of the positioning actuator (20) from changing.

The or each positioning jack (20a) comprises a rod (48) and a cylinder. To make adjusting the position of the central pin (13) with wedges (32) easier, the rod (48) goes through the cylinder of the or each positioning jack (20a) on either side. The rod (48) of the or each positioning jack (20a) is articulated to the central pin (13) along the central axis (13a). The cylinder of the or each positioning jack (20a) is articulated to the chassis (2) by the inner joint (35). At the end of the rod (48) opposite the central axis (13a) a support element (44) is fastened with the rod (48). In work configuration, the wedges (32) are jammed between this support element (44) and the cylinder of the or each positioning jack (20a), thus preventing it from extending.

In the embodiment variant shown in FIG. 6, the lift actuator (18) and the positioning actuator (20) are connected to a respective distributing valve (21, 23) of the tractor (T). In this variant, the locking means (22) can be embodied by the distributing valve (23) that is connected to the positioning actuator (20) and that is closed in the work configuration. To switch the machine (1) from the work configuration to the headland configuration, the user must first activate the distributing valve (23) connected to the positioning actuator (20) and then the distributing valve connected to the lift actuator (18). In this embodiment variant, the user must keep to the order of activation of the lift actuator (18) and the positioning actuator (20) to avoid damaging the vegetation covering of the ground (B) at every switch between work configuration and headland configuration.

To switch the machine (1) from the work configuration (FIG. 3) to the headland configuration (FIG. 4), the pump (24) is connected to the main pipe (25). To connect the main pipe (25) to the pump (24), the control device (15) is activated. To automatically prevent damaging the vegetation covering, the machine (1) comprises a sequencing system (28) configured to prevent the carrier (6) from pivoting upward around the central pin (13) when the central pin (13) is in a triggering position or above (the triggering position). The triggering position is a position of the central pin (13) relative to the chassis (2), in which the central pin (13) is higher than in work configuration. Preferably, the sequencing system (28) comprises a first sensor (40) to detect when the central pin (13) is in the so-called "triggering" position, or above.

Preferably, the first sensor (40) is a lever making it possible to open and close a hydraulic sequencing valve (34). The sequencing valve (34) is mounted on the primary pipe (26). As shown in FIGS. 7 to 9, the sequencing valve (34) then splits the primary pipe (26) into an initial pipe (26a) and an extension pipe (26b). The initial pipe (26a) connects the main pipe (25) to the sequencing valve (34). The extension pipe (26b) connects the sequencing valve (34) to the lift actuator (18). When the central pin (13) is below the triggering position, as in work configuration for example, the sequencing valve (34) prevents fluid flowing from the initial pipe (26a) toward the lift actuator (18), as shown in FIGS. 7 and 9. When the central pin (13) is in triggering position or above, as per FIG. 4, the sequencing valve (34) is open, as shown in FIG. 8. The sequencing valve (34) is part of the sequencing system (28). The sequencing valve (34) makes it possible to prevent the lift actuator (18) from being operated when the central pin (13) is not in the triggering position.

In the intermediate configuration, the central pin (13) is in triggering position. Preferably, in triggering position, the central pin (13) is at the top of the sliding guide (19). Preferably, in a transport configuration of the machine (1), the central pin (13) is also in the triggering position. In the transport configuration (not shown), the size of the machine (1) along the rotary axis (R) is reduced. In this transport configuration, the supports (9) are moved away from the ground (B) and preferably the rotors (7) are brought close to the chassis (2) by pivoting.

In this way, when the main pipe (25) is connected to the pump (24), the positioning actuator (20) is initially extended, up to the triggering position of the central pin (13), which then causes the sequencing valve (34) to open and hydraulically connects the pump (24) to the lift actuator (18), the lift actuator (18) being then subsequently retracted.

The machine (1) is then in the headland configuration. Thanks to the sequencing system (28), the front of the carrier (6) and the front portion of the rotors (7) are thus automatically moved away from the ground (B) up to the intermediate configuration, before being pivoted upward, relative to the chassis (2), around the central pin (13). Advantageously, a single control device (15) is required to switch the machine (1) from the work configuration to the headland configuration, while preserving the vegetation covering of the ground (B) during this switch. Furthermore, the user does not have to think in which order the positioning (20) and lift actuators (18) are to be activated.

To allow the user to decide when the lifting of the carrier (6) occurs in relation to the lifting of the front portion of the rotors (7), the triggering position could be adjustable, for example by adjusting or moving the first sensor (40). In this way, the user could choose between a faster switch from the work configuration to the headland configuration, and better preserving the vegetation covering of the ground (B).

Preferably, the sequencing system (28) comprises a second sensor (41) configured to detect when the machine (1) is in work configuration. In the alternative embodiment shown in FIGS. 7 and 8, the second sensor (41) is a switch making it possible to detect when the wedges (32) or, where applicable, the cylinder of one, of each, or of the positioning jack (20a) is in contact with the support element (44). The first sensor (40) and the second sensor (41) could also be embodied by a single position sensor detecting the position of the piston of the or of each positioning jack (20a).

In the alternative embodiment, the second sensor (41) makes it possible to open and close the adaptor valve (43) mounted as a bypass to the sequencing valve (34). Preferably, the sequencing valve (34) is part of the sequencing system (28). The adaptor valve (43) is mounted on a tertiary pipe (45) plugged into the terminals of the sequencing valve (34). The tertiary pipe (45) is thus connected to the initial pipe (26a) on one hand and to the extension pipe (26b) on another hand. As shown in FIG. 7, the adaptor valve (43) is open when the machine (1) is in work configuration (FIG. 3), enabling a change in the length of the lift actuator (18). Accordingly, the pivoting of the carrier (6) around the central pin (13) is advantageously free in work configuration. In the work configuration, as shown in FIG. 7, the main pipe (25) is connected to the reservoir (30). In the circuit of FIG. 7, no pipe is pressurized. Consequently, in work configuration, the carrier (2) can track the unevenness of the ground (B) and advantageously prevent damage to the vegetation covering or leaving unraked product when the machine (1) is fitted with a sequencing valve (34), thus improving the quality of the work of the machine (1).

As shown in FIG. 8, when the machine (1) is not in work configuration, the adaptor valve (43) prevents fluid flowing from the tertiary pipe (45) toward the lift actuator (18). The sequencing system (28) is then configured to prevent the carrier (6) pivoting upward around the central pin (13) when the central pin (13) is located between its position in work configuration and its triggering position. When the machine (1) is in the headland, transport, or intermediate configuration, as shown in FIG. 8 for example, the hydraulic circuit is pressurized, unlike in work configuration.

According to an alternative embodiment, the sequencing system (28) is embodied by an electronic control unit that activates the positioning actuator (20) and, after a time-lag, activates the lift actuator (18) when switching from the work configuration to the headland configuration. During the switch from the headland configuration to the work configuration, the electronic control unit initially activates the lift actuator (18) and, after a time-lag, activates the positioning actuator (20).

While switching the machine (1) from the work configuration to the headland configuration, as soon as the second sensor (41) detects that the machine (1) is no longer in work configuration, the sequencing system (28) prevents the lift actuator (18) from being activated and the carrier (6) from pivoting upward around the central pin (13). When the main pipe (25) is connected to the pump (24), the positioning actuator (20) is still connected to the pump (24). When the central pin (13) is located between its position in work configuration and its triggering position, and the main pipe (25) is connected to the pump (24), the positioning actuator (20) continues to be activated and the front of the carrier (6) raised. Once the machine (1) is in intermediate configuration, the sequencing valve (34) is open, causing the lift actuator (18) to be activated and the carrier (6) to pivot upward around the central pin (13). When the lift actuator (18) is at its minimum extension, the machine (1) is in headland configuration, as shown in FIG. 4.

The kinematics of the machine (1) described above is such that retracting the positioning actuator (20) entails extending the lift actuator (18). The forces of the lift (18) and positioning (20) actuators are therefore opposed when in work configuration, the main pipe (25) is connected to the pump (24) until the second sensor (41) detects that the machine (1) is no longer in work configuration.

According to an interesting feature of the invention, it is provided for the lower end of the sliding guide (19) to be further away from a straight plane (Q) orthogonal to the direction of advance (A) and located in front of the sliding guide (19) than the upper end of the sliding guide (19). This feature makes it possible to reduce the opposed forces of the lift (18) and positioning (20) actuators when activating the control device (15) in work configuration. Advantageously, the upward movement of the central pin (13) entails a smaller change in the length of the lift actuator (18), thus reducing the opposition of their forces. In this way, the switch between the work configuration and the headland configuration advantageously entails less stress. It is also smoother and faster. Preferably, the straight plane (Q) passes by the rotary axis (R). In a variant (not shown) the straight plane (Q) passes by the front joint (4). The straight plane (Q) is also orthogonal to the reference plane (P) in side view. In the embodiment variant of FIG. 4, the sliding guide (19) is oriented vertically.

In the preferred embodiment, the sliding guide (19) is rectilinear and preferably tilted frontward. As shown in FIG. 3, the sliding guide (19), respectively its length, can be oriented in a substantially parallel way to at least one drive axis (8) in work configuration.

To reduce the opposed forces of the lift (18) and positioning (20) actuators when activating the control device (15) in work configuration, the lift actuator (18) is connected to the tractor (T) and to a hydraulic receiver (31). A hydraulic receiver (31) is a cylinder or a hydraulic pressure accumulator, for example. Thanks to the hydraulic receiver (31), even if the lift (18) and positioning actuators (20) are activated at the same time, the fluid exiting the lift actuator (18) is transferred towards the hydraulic receiver (31), advantageously enabling a faster and smoother switch between the work configuration and the headland configuration.

As shown in FIG. 1, the carrier (6) comprises a middle segment (16) to which are articulation several lateral segments (17), on either side of the middle segment (16). On the middle segment (16), two central rotors (7) are mounted, each driven around a respective drive axis (8). On each lateral segment (17), one or two lateral rotors (7) are mounted, each driven around a respective drive axis (8). The lateral segments (17) are articulated to the middle segment (16) by means of central pivot axes (38). The lateral segments (17) are articulated to each other by means of pivot axes (36). In work configuration the pivot axes (38) are substantially parallel to the direction of advance (A) in top view. They are perpendicular to the drive axes (8), at least in side view. The pivot axes (36) are substantially parallel to the central pivot axes (38) in work configuration.

It can be seen in FIG. 2, that the machine (1) comprises at least one tensioning jack (37) enabling the lateral segments (17) to be made to pivot relative to the middle segment (16) around the central pivot axes (38). Thanks to the tensioning jack (37), the lateral segments (17) are kept fixed in rotation around the central pivot axes (38) in headland configuration so as to move the rotors (7), especially the outside rotors, further away from the ground (B). Other means and/or actuators make possible to prevent the lateral segments (37) from pivoting with each other around the pivot axes (36) in headland configuration. The tensioning jack (37) is hydraulic and translational. Preferably it operates in sngle-effect mode. To ensure a uniform raking over the entire width of the machine (1) in work configuration, a spring (52) tends to lengthen the tensioning jack (37), thus pressing the lateral segments (17) against the ground (B) in work configuration.

According to another interesting feature of the invention, to prevent the opposed forces of the lift (18) and positioning (20) actuators, the tensioning jack (37) is connected hydraulically to the lift actuator (18). In other words, the hydraulic receiver (31) is embodied by the tensioning jack (37). Preferably, the tensioning jack (37) is connected to the primary pipe (26). More specifically, it is connected to the extension pipe (26b). Consequently, when the sequencing (34) and adaptor (43) valves are closed, the lift actuator (18) and tensioning jack (37) are hydraulically isolated. When the lift actuator (18) and the tensioning jack (37) are hydraulically isolated, and the positioning actuator (20) moves the central pin (13) upward, the lift actuator (18) extends, and the tensioning jack (37) retracts. Because retracting the tensioning jack (37) causes the lateral segments (17) to pivot upward, the outside rotors (7) are quickly moved away from the ground (B) after the control device (15) has been activated, making it possible to avoid damaging the swaths formed more quickly.

In the alternative embodiment of FIGS. 7 and 8, the valves (34, 43) being closed when the central pin (13) passes from its position in work configuration to its triggering position, pressurize the hydraulic circuit. Extending the lift actuator (18) at the same time as retracting the positioning actuator (20) thus entails a friction of the central pin (13) with the sliding guide (19), which can cause premature wear of the sliding guide (19) and/or of the central pin (13).

To prevent premature wear of the central pin (13) and/or the sliding guide (19) especially at the top of the sliding guide (19), in the preferred embodiment represented in FIG. 9, the second sensor (41) is a lever making it possible to open and close the adaptor valve (43). The adaptor valve (43) is connected to the extension pipe (26b) by a tertiary pipe (45). In the preferred embodiment, the adaptor valve (43) is on another hand connected to the reservoir (30) by a quaternary pipe (51) in work configuration. In work configuration, to enable the carrier (6) to track the unevenness of the ground (B), the adaptor valve (43) is open. In this document, when a valve (34, 43) is "open", it allows fluid to flow in all directions.

When the main pipe (25) is connected to the pump (24), the positioning actuator (20) is extended, up to the triggering position of the central pin (13), causing the adaptor valve (43) to close in the preferred embodiment. In the embodiment of FIG. 9, the adaptor valve (43) prevents fluid flowing outside the lift actuator (18) when the central pin (13) is in the triggering position or above. In this embodiment, the hydraulic circuit is consequently not pressurized when the central pin (13) changes from its position in work configuration to its triggering position, advantageously preventing wear of the sliding guide (19) and/or of the central pin (13).

To switch the machine (1) from its headland configuration to its work configuration, the main pipe (25) is connected to the reservoir (30), preferably by means of the control device (15). During this switch, the weight of the carrier (6) will in a first stage cause it to pivot downward around the central axis (13a). To achieve this, at least one of the sequencing (34) and adaptor (43) valves is one-way in its closed configuration. As can be seen in FIG. 7, the sequencing (34) and adaptor (43) valves are one-way in order to allow fluid to flow from the lift actuator (18) toward the main pipe (25). In a second stage, the energy accumulator (50) makes it possible to move the central pin (13) from its triggering position to its position in work configuration.

As can be seen in FIG. 3, the sliding guide (19) is fitted, at its upper end, with a nose (46) pointing forward. In this way, the sliding guide (19) has a surface (47) on which the central pin (13) rests when the central pin (13) is at the upper end of the sliding guide (19). Therefore, when the machine (1) is in headland configuration, the central pin (13) rests on the surface (47) of the nose (46). Preferably, the surface (47) is horizontal. In the nose (46), the central pin (13) is in a stable position. During the switch from the headland configuration to the work configuration, as soon as the carrier (6), respectively the support (9), again reaches the ground (B), the machine (1) is in intermediate configuration. The central pin (13) then comes out of the nose (46). The nose (46) thus makes it possible to prevent the front fingers (10) of the rotors (7) from touching the ground (B) during the switch from the headland configuration to the work configuration. In this way, the vegetation covering of the ground (B) is preserved.

Of course, the invention is not limited to the embodiments or implementation variants described and shown in the attached drawings. In particular, the embodiments and implementation variants can be combined or realized separately. Modifications remain possible, in particular concerning the composition of the various elements or by substituting technical equivalents without departing from the scope of protection of the invention.

The invention claimed is:

1. An agricultural haymaking machine, specifically a tedder, comprising a chassis resting on the ground by means of at least one wheel, the machine being coupled to a tractor able to move it in a direction of advance, the machine comprising a carrier bearing a plurality of rotors, the carrier being swivel mounted with regard to the chassis around a central pin oriented transversally to the direction of advance, each rotor being driven around a respective drive axis, the machine comprising a lift actuator articulated to the chassis on one hand and to the carrier on another hand and being able to make the carrier pivot in relation to the chassis around the central pin, the machine being able to adopt a headland configuration in which the carrier is raised, as well as a work configuration in which the carrier rests on the ground by means of a support; wherein the central pin is rigidly attached to the carrier; wherein the machine comprises a positioning actuator making it possible to move the central pin relative to the chassis to change the position of the drive axes; and wherein a sliding guide is made in the chassis to guide the motion of the central pin relative to the chassis, the lower end of the sliding guide being further away from a straight plane orthogonal to the direction of advance and located in front of the sliding guide than its upper end.

2. The machine according to claim 1, wherein a control device makes it possible to simultaneously activate the lift actuator and the positioning actuator.

3. The machine according to claim 1 wherein the lift actuator is embodied by at least one jack, wherein the positioning actuator is embodied by at least one positioning jack; and wherein a main pipe connects the tractor to a primary pipe connected to the lift actuator and to a secondary pipe connected to the positioning actuator.

4. The machine according to claim 1, wherein pivoting of the carrier around the central pin is free in work configuration; and wherein a locking means keeps the central pin fixed in translation relative to the chassis.

5. The machine according to claim 1, wherein the machine comprises a sequencing system configured to prevent the carrier from pivoting upward around the central pin when the central pin is in a triggering position or above.

6. The machine according to claim 5, wherein the sequencing system is configured to prevent the carrier from pivoting upward around the central pin when the central pin is located between its position in work configuration and its triggering position.

7. The machine according to claim 1, wherein the sliding guide is fitted, at its upper end, with a nose pointing forward.

8. The machine according to claim 1, wherein the lift actuator is connected to the tractor and to a hydraulic receiver.

9. The machine according to claim 8, wherein the carrier comprises a middle segment to which are articulated several lateral segments on either side of the middle segment by means of central pivot axes; wherein at least one tensioning jack enables the lateral segments to pivot relative to the middle segment around the central pivot axes; and wherein the hydraulic receiver is embodied by the tensioning jack.

* * * * *